US011865689B2

(12) United States Patent
Kusagawa et al.

(10) Patent No.: US 11,865,689 B2
(45) Date of Patent: Jan. 9, 2024

(54) IMPACT ROTARY TOOL

(71) Applicant: Panasonic Intellectual Property Management Co., Ltd., Osaka (JP)

(72) Inventors: Takashi Kusagawa, Osaka (JP); Takahiro Ueda, Osaka (JP); Akiko Honda, Osaka (JP); Kimitaka Ozawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/881,290

(22) Filed: Aug. 4, 2022

(65) Prior Publication Data

US 2023/0051397 A1 Feb. 16, 2023

(30) Foreign Application Priority Data

Aug. 10, 2021 (JP) ................................ 2021-130533

(51) Int. Cl.
*B25F 5/00* (2006.01)
*B25B 21/02* (2006.01)

(52) U.S. Cl.
CPC .............. *B25F 5/006* (2013.01); *B25B 21/02* (2013.01)

(58) Field of Classification Search
CPC ....... B25F 5/006; B25B 21/02; B25B 21/026; B25D 11/00–125; B25D 2217/0015; B25D 17/11; B25D 17/24
USPC .......... 173/93, 114, 117, 202, 212, 128, 1, 2
See application file for complete search history.

(56) References Cited

U.S. PATENT DOCUMENTS 3,837,179 A * 9/1974 Barth ........................ F16D 3/68 464/182
3,952,819 A * 4/1976 Adcock ................... E21B 10/40 175/426
4,919,022 A * 4/1990 Ono ...................... B25B 21/004 81/464
RE33,711 E * 10/1991 Ono ........................ B25B 21/02 81/464
5,226,487 A * 7/1993 Spektor ................... E21B 4/145 173/133
5,601,149 A * 2/1997 Kawasaki ............. B25B 21/026 173/93.5

(Continued)

FOREIGN PATENT DOCUMENTS

JP H07-237152 A 9/1995

OTHER PUBLICATIONS

Extended European Search Report dated Jan. 16, 2023 issued in the corresponding European Patent Application No. 22188975.1.

*Primary Examiner* — Dariush Seif
(74) *Attorney, Agent, or Firm* — Rimon P.C.

(57) ABSTRACT

An impact rotary tool includes a hammer and an anvil that transmits rotational impact force from the hammer to a tip tool. The anvil includes a first member and a second member. The first member holds the tip tool thereon. The first member is fitted into the second member. The rotational impact force is applied to the second member. The first member and the second member are arranged to be fitted into each other in a fitting portion. The fitting portion has a tolerating mechanism. The tolerating mechanism tolerates misalignment of a first rotational axis with a second rotational axis. The first rotational axis is a rotational axis of the first member. The second rotational axis is a rotational axis of the second member.

9 Claims, 6 Drawing Sheets

(56) References Cited

U.S. PATENT DOCUMENTS 5,873,786 A * 2/1999 Hosoya .................... F16F 7/00 464/92
6,125,952 A * 10/2000 Beccu ...................... E21B 4/14 173/78
6,223,834 B1 * 5/2001 Takamura .............. B25B 21/02 173/93.5
8,191,649 B2 * 6/2012 Zhu ........................ B25B 21/02 173/104
8,651,198 B2 * 2/2014 Ito .......................... B25B 21/02 173/93.5
11,707,818 B2 * 7/2023 Li ......................... B25D 17/06 173/90
2006/0254786 A1 * 11/2006 Murakami ............. B25B 21/02 173/93.5
2006/0254789 A1 * 11/2006 Murakami ............. B25F 5/006 173/128
2007/0034398 A1 * 2/2007 Murakami ............. B25B 21/02 173/128
2007/0179328 A1 * 8/2007 Murakami ............. B25B 21/02 585/448
2008/0087448 A1 * 4/2008 Happ .................... B25B 21/023 173/93
2010/0000750 A1 * 1/2010 Andel .................. B25B 21/026 173/217
2012/0199372 A1 * 8/2012 Nishikawa ............. B25B 21/02 173/132
2012/0292065 A1 * 11/2012 Hoshi .................... B25B 21/02 173/93
2012/0325509 A1 * 12/2012 Puzio ..................... B25B 21/02 81/177.85
2013/0008679 A1 * 1/2013 Nishikawa ............. B25B 21/02 173/93
2013/0062088 A1 * 3/2013 Mashiko ................ B25B 21/02 173/48
2014/0262394 A1 * 9/2014 Scott .................. B25B 23/0007 173/48
2015/0041169 A1 * 2/2015 Kumagai ............... B25D 17/26 173/93.7
2016/0075004 A1 * 3/2016 Tsubakimoto ........ B25B 21/026 173/93
2017/0028537 A1 * 2/2017 McClung ............ B25B 23/0035
2019/0030696 A1 * 1/2019 Seith ...................... B25B 21/02
2019/0160636 A1 * 5/2019 Hirabayashi ......... B25D 16/006
2020/0001440 A1 * 1/2020 Lee ...................... B25B 21/002
2021/0060755 A1 * 3/2021 Kawai ....................... B25F 5/00
2022/0111497 A1 * 4/2022 Sano ...................... B25B 21/02
2022/0212320 A1 * 7/2022 Kawai .................... B25B 21/02
2022/0331937 A1 * 10/2022 Nick .................... B25B 21/026
2023/0158623 A1 * 5/2023 Kawai .................. B25B 21/026 184/6
2023/0166389 A1 * 6/2023 McClung .............. B25B 21/026 173/2

* cited by examiner

IMPACT ROTARY TOOL

CROSS-REFERENCE TO RELATED APPLICATIONS

The present application is based upon, and claims the benefit of priority to, Japanese Patent Application No. 2021-130533, filed on Aug. 10, 2021, the entire contents of which are hereby incorporated by reference.

TECHNICAL FIELD

The present disclosure generally relates to an impact rotary tool and more particularly relates to an impact rotary tool having the capability of reducing vibrations to be produced when a fastening member such as a screw or a bolt is tightened.

BACKGROUND ART

JP H07-237152 A discloses a rotational impact tool including an anvil that transmits rotational impact force from a hammer, which may make rotational movement and reciprocating movement, to a tip tool. In the rotational impact tool of JP H07-237152 A, the anvil includes: a tip tool attaching member, to which the tip tool is attached; and a rotational impact transmitting member that transmits the rotational impact force from the hammer to the tip tool attaching member, and a shock absorber is provided between these two members.

In the rotational impact tool of JP H07-237152 A, the shock absorber provided between the tip tool attaching member and the rotational impact transmitting member contributes to reducing the vibrations to be produced in the axial direction when a fastening member such as a screw is tightened.

In the rotational impact tool of JP H07-237152 A, however, the tip tool attaching member and the rotational impact transmitting member are coupled together and fixed to each other with the rotational axis of the former aligned with that of the latter (in other words, with no misalignment of the rotational axis of the former with respect to the latter tolerated). Thus, misalignment of the rotational axis of the latter with the direction in which the fastening member such as a screw is inserted (hereinafter referred to as an "inserting direction") causes the rotational axis of the former to be misaligned with the inserting direction as well, thus producing vibrations in the radial direction.

SUMMARY

The present disclosure provides an impact rotary tool contributing to reducing such vibrations to be produced in the radial direction when a fastening member such as a screw is tightened.

An impact rotary tool according to an aspect of the present disclosure includes a hammer and an anvil that transmits rotational impact force from the hammer to a tip tool. The anvil includes a first member and a second member. The first member holds the tip tool thereon. The first member is fitted into the second member. The rotational impact force is applied to the second member. The first member and the second member are arranged to be fitted into each other in a fitting portion. The fitting portion has a tolerating mechanism. The tolerating mechanism tolerates misalignment of a first rotational axis with a second rotational axis. The first rotational axis is a rotational axis of the first member. The second rotational axis is a rotational axis of the second member.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Figure 1:
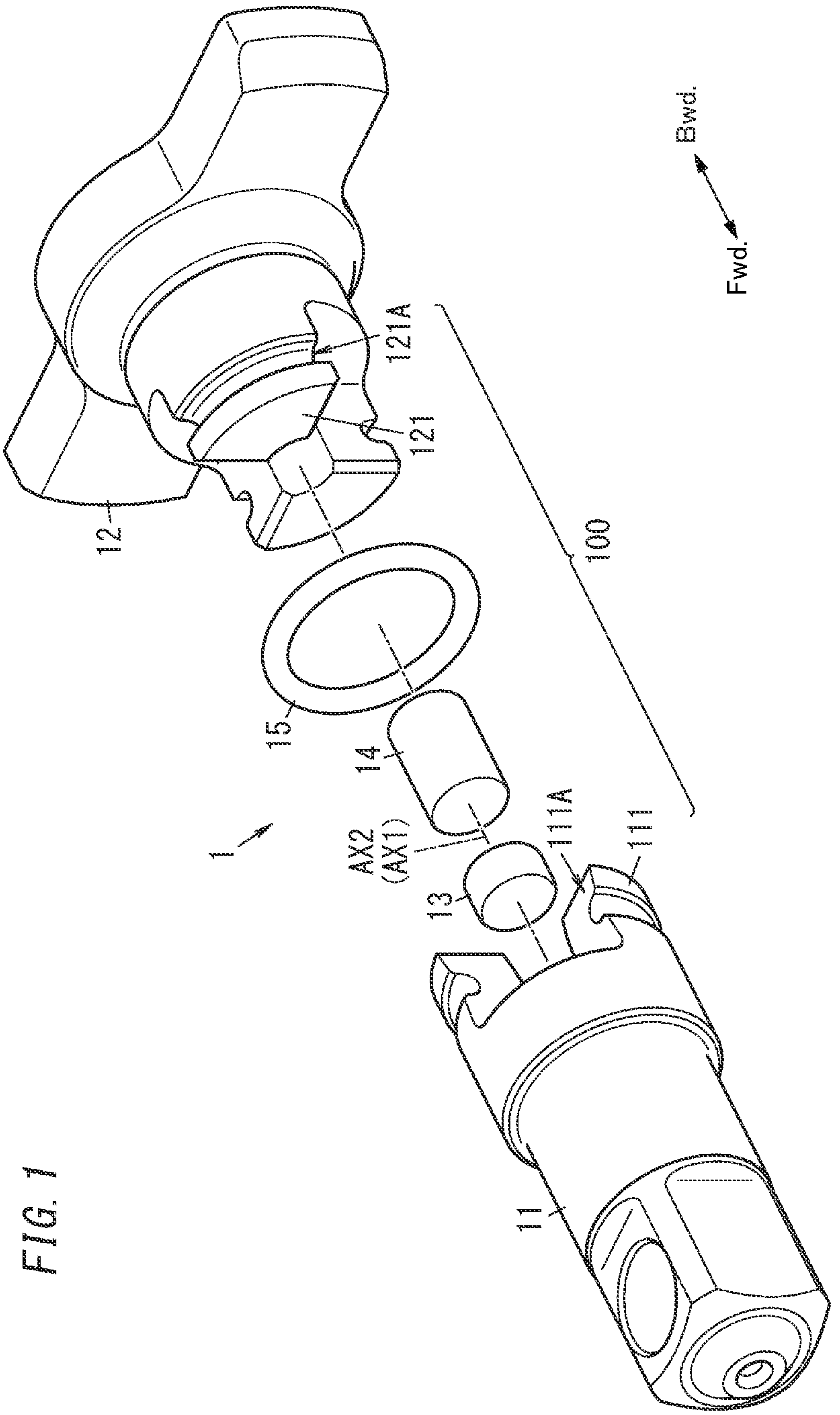
FIG. 1 is an exploded perspective view of an anvil which forms part of an impact rotary tool according to an embodiment of the present disclosure.
Figure 2:
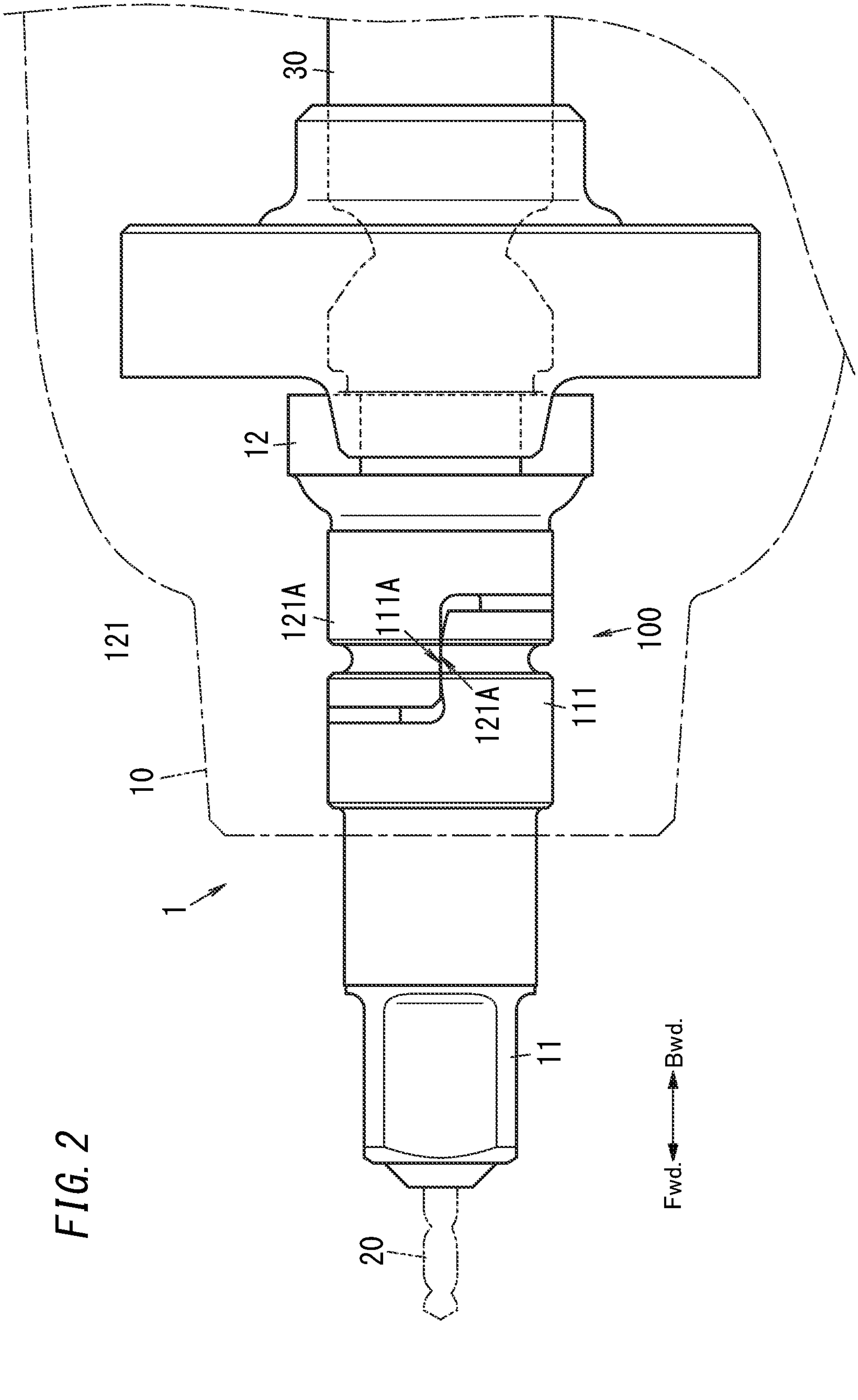
FIG. 2 is a side view of the anvil.

The drawings to be referred to in the following description of embodiments are all schematic representations. Thus, the ratio of the dimensions (including thicknesses) of respective constituent elements illustrated on the drawings does not always reflect their actual dimensional ratio. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure.

(1) Impact Rotary Tool

An impact rotary tool 10 according to an exemplary embodiment includes an anvil 1 such as the one shown in FIGS. 1-3A.

The anvil 1 transmits rotational impact force from a hammer 30 to a tip tool 20. The rotational impact force includes impacting force applied in the axial direction and rotational force applied around an axis. As used herein, the "axial direction" refers to a direction aligned with a rotational axis AX2 (to be described later) and the phrase "around an axis" means "around the rotational axis AX2." The tip tool 20 is used to tighten a fastening member such as a screw or a bolt with the rotational impact force.

(2) Anvil

The anvil 1 includes a first member 11 and a second member 12. The first member 11 holds the tip tool 20 thereon. The first member 11 is fitted into the second member 12. The rotational impact force is applied to the second member 12.

Specifically, a rear end portion of the first member 11 is fitted into a frontend portion of the second member 12. The tip tool 20 is attached to a frontend portion of the first member 11. The frontend portion of the first member 11 is movable in a radial direction (i.e., a direction intersecting with the axial direction) with respect to the second member 12.

The rotational impact force, applied from the hammer 30 to the rear end portion of the second member 12 with the tip tool 20 engaged with the fastening member such as a screw, is transmitted to the tip tool 20 via the second member 12 and the first member 11. This allows the rotational impact force to be applied to the fastening member such as a screw, thus causing the fastening member such as a screw to be pressed in the direction in which a screw hole, for example, extends and tightened.

(3) Fitting Portion

The fitting portion 100 is a portion in which the first member 11 and the second member 12 are fitted into each other.

The fitting portion 100 includes a first fitting portion 111 and a second fitting portion 121. The first fitting portion 111 forms part of the first member 11 and is fitted into the second member 12. The first fitting portion 111 has a first surface 111A as one surface thereof. The second fitting portion 121 forms part of the second member 12 and is fitted into the first member 11. The second fitting portion 121 has a second surface 121A as one surface thereof. The first surface 111A and the second surface 121A face each other.

More specifically, each of the first fitting portion 111 and the second fitting portion 121 has the shape of a cylinder in which cutout parts and non-cutout parts are arranged alternately. Meshing the non-cutout parts of the first fitting portion 111 with the cutout parts of the second fitting portion 121 forms the fitting portion 100.

(4) Tolerating Mechanism

The fitting portion 100 according to this embodiment has a tolerating mechanism (111A, 121A).

The tolerating mechanism (111A, 121A) tolerates misalignment of a first rotational axis AX1 with a second rotational axis AX2. The first rotational axis AX1 is a rotational axis of the first member 11. The second rotational axis AX2 is a rotational axis of the second member 12.

Figure 3A:
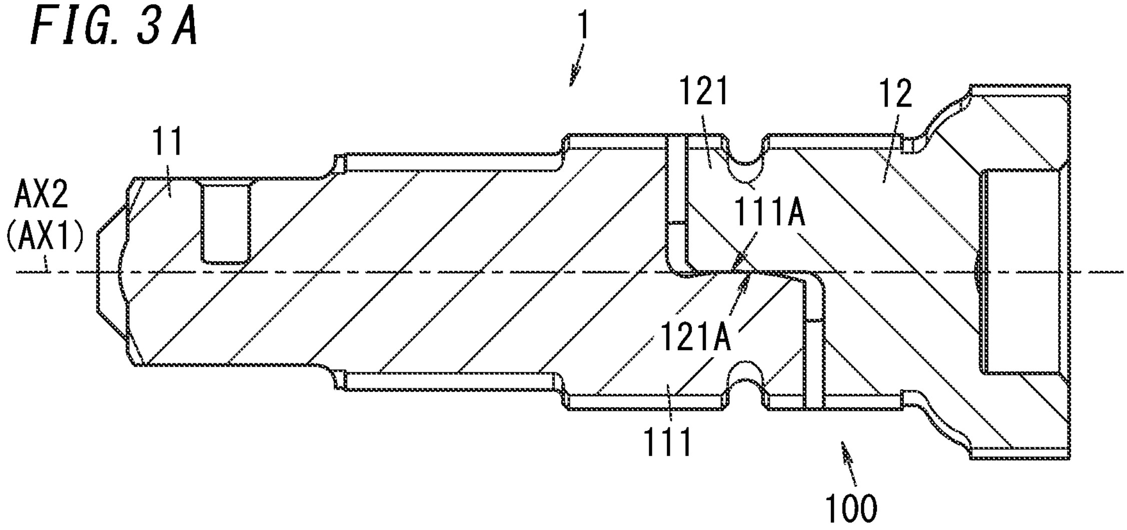
FIG. 3A is a cross-sectional view of the anvil in a state where no misalignment has been caused.
Figure 3B:
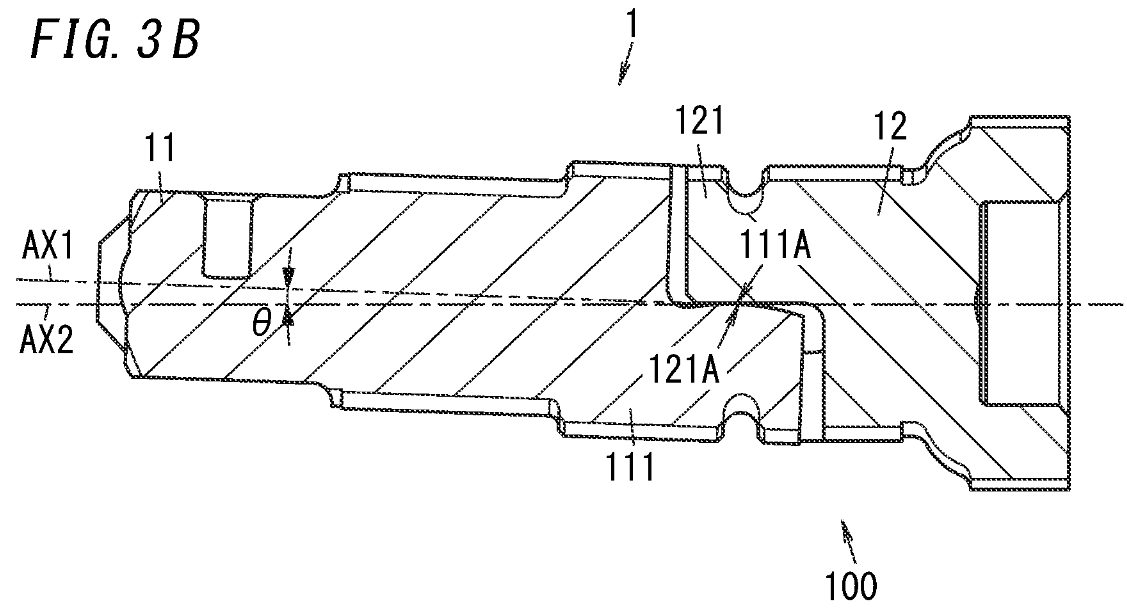
FIG. 3B is a cross-sectional view of the anvil in a state where misalignment has been caused.

As used herein, the "misalignment" is caused when the angle $\theta$ formed between the first rotational axis AX1 and the second rotational axis AX2 as shown in FIG. 3B, for example, exceeds a predetermined first threshold value $\theta 1$.

The first threshold value $\theta 1$ may be, for example, equal to 0 degrees but may also be larger than 0 degrees (e.g., an angle falling within the range from 0.5 degrees to 2 degrees).

As can be seen, having the misalignment between the first rotational axis AX1 and the second rotational axis AX2 tolerated by the tolerating mechanism (111A, 121A) allows, even if the second rotational axis AX2 is misaligned with the direction in which a fastening member is inserted, the first rotational axis AX1 to be kept aligned with the direction in which the fastening member is inserted, thus contributing to reducing the vibrations produced in the radial direction when the fastening member is tightened.

(4-1) Means for Implementing Tolerating Mechanism

The tolerating mechanism (111A, 121A) according to this embodiment is implemented by forming at least a part of the first surface 111A and/or at least a part of the second surface 121A in a convex curved surface shape. The first surface 111A and the second surface 121A face each other as described above.

(4-1-1) Arrangement of Convex Curved Surface Part

That part to be formed in the convex curved surface shape (hereinafter referred to as a "convex curved surface part") may be present on, for example, either the first surface 111A or the second surface 121A.

Figure 4A:
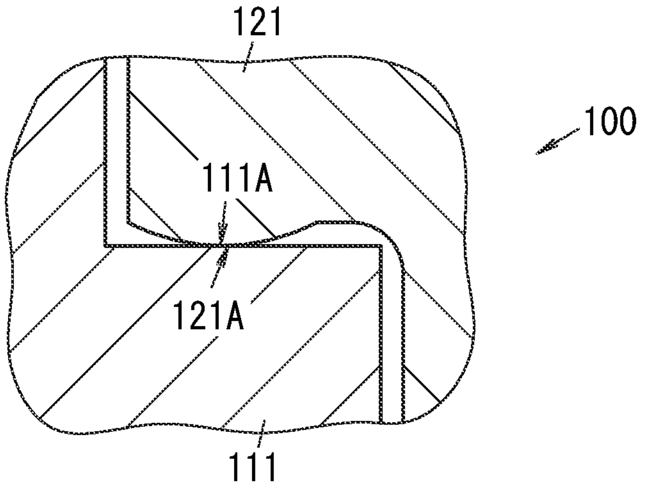
FIG. 4A is a cross-sectional view of a fitting portion of the anvil in a situation where there is a spherical convex curved surface portion as a part of the second surface.
Figure 4B:
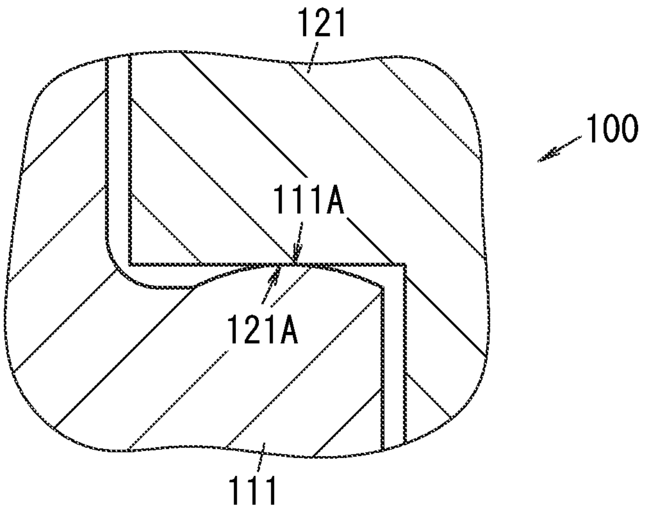
FIG. 4B is a cross-sectional view of the fitting portion of the anvil in a situation where there is a spherical convex curved surface portion as a part of the first surface.
Figure 5A:
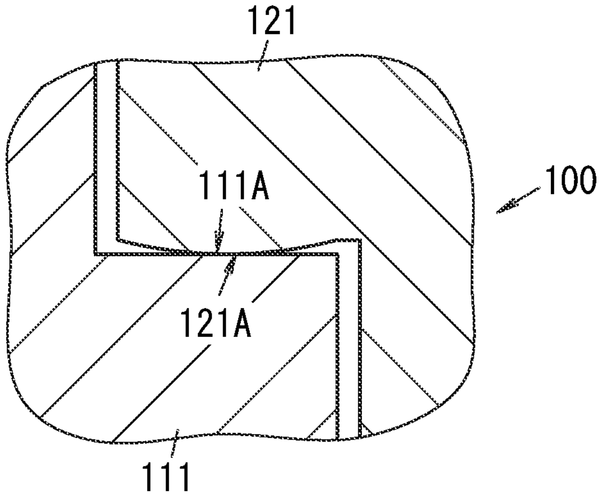
FIG. 5A is a cross-sectional view of a fitting portion of the anvil in a situation where there is a spherical convex curved surface portion that covers almost all of the second surface.
Figure 5B:
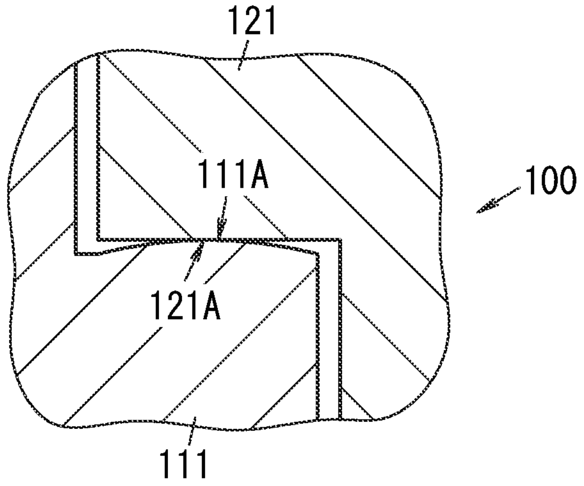
FIG. 5B is a cross-sectional view of the fitting portion of the anvil in a situation where there is a spherical convex curved surface portion that covers almost all of the first surface.
Figure 6A:
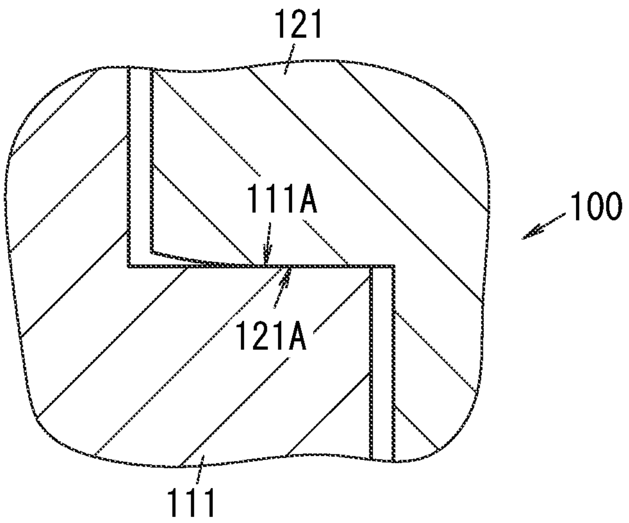
FIG. 6A is a cross-sectional view of a fitting portion of the anvil in a situation where the second surface has a convex curved surface portion as a rounded corner portion thereof.
Figure 6B:
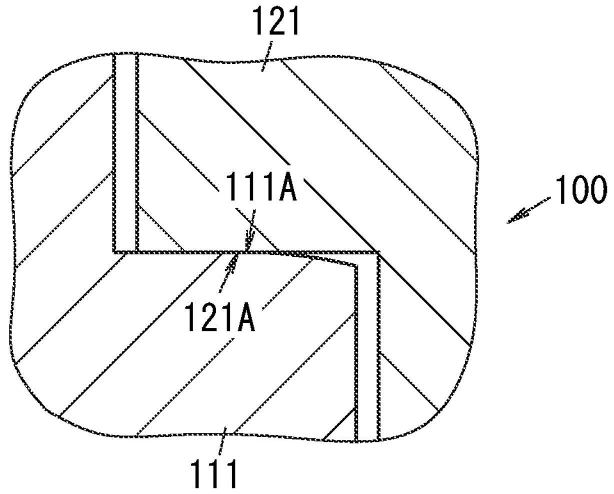
FIG. 6B is a cross-sectional view of the fitting portion of the anvil in a situation where the first surface has a convex curved surface portion as a rounded corner portion thereof.

Specifically, the convex curved surface part may be present on the second surface 121A as shown in FIGS. 4A, 5A, and 6A, for example. Alternatively, the convex curved surface part may also be present on the first surface 111A as shown in FIGS. 4B, 5B, and 6B, for example.

Note that, in this case, the other surface (i.e., the surface with no convex curved surface parts) is normally a flat surface as shown in either FIGS. 4A, 5A, and 6A or FIGS. 4B, 5B, and 6B. However, this is only an example and should not be construed as limiting. Alternatively, the other surface may also be formed in a concave curved surface shape, of which the curvature is smaller than the curvature of the convex curved surface part.

This enables implementing the tolerating mechanism (111A, 121A) by a simple method.

(4-1-1a) Preferred Arrangement #1

It is preferable that the convex curved surface part be present to form part of either the first surface 111A or the second surface 121A.

The convex curved surface part according to this embodiment may be present, for example, to form either a part of the second surface 121A as shown in FIG. 4A or a part of the first surface 111A as shown in FIG. 4B.

Note that, in this case, each of the rest of the one surface (i.e., the surface with the convex curved surface part) and the other surface (i.e., the surface with no convex curved surface parts) is normally a flat surface as shown in either FIG. 4A or 4B. However, this is only an example and should not be construed as limiting. Alternatively, each of the rest of the one surface and the other surface may also be formed in a concave curved surface shape, of which the curvature is smaller than the curvature of the convex curved surface part.

This may reduce the area of contact between the first surface 111A and the second surface 121A, thus enabling implementing a tolerating mechanism (111A, 121A) that tolerates misalignment in a broad range by a simple method.

(4-1-1b) Preferred Arrangement #2

Alternatively, the convex curved surface part may also be present to cover almost all of either the first surface 111A or the second surface 121A, as shown in FIGS. 5A and 5B, for example.

This may increase the area of contact between the first surface 111A and the second surface 121A, thus enabling implementing a tolerating mechanism (111A, 121A) with a high degree of durability by a simple method.

(4-1-1c) Other Arrangements

Figure 4C:
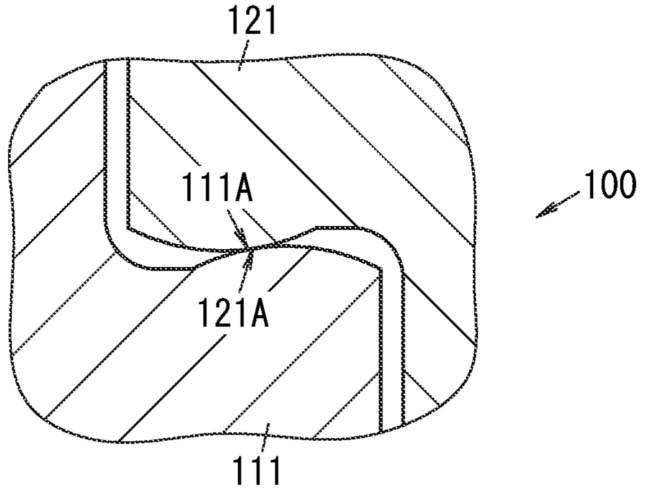
FIG. 4C is a cross-sectional view of the fitting portion of the anvil in a situation where there are spherical convex curved surface portions as respective parts of the first and second surfaces.
Figure 5C:
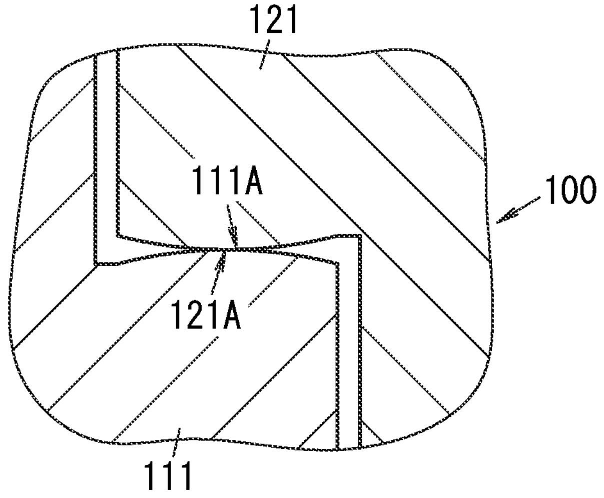
FIG. 5C is a cross-sectional view of the fitting portion of the anvil in a situation where there are spherical convex curved surface portions that respectively cover almost all of the first and second surfaces.

Still alternatively, the convex curved surface part may also be present to form part of each of the first surface 111A and the second surface 121A as shown in FIGS. 4C and 5C, for example. In that case, in each of the first surface 111A and the second surface 121A, only a part of the surface may be the convex curved surface part as shown in FIG. 4C or almost all of the surface may be the convex curved surface part as shown in FIG. 5C, whichever is appropriate.

(4-1-2) Shape of Convex Curved Surface Part

The convex curved surface part may have, for example, a constant curvature (i.e., may have a spherical shape). Nevertheless, the curvature does not have to be constant.

(4-1-2a) Preferred Shape

The convex curved surface part may have, for example, a spherical shape as in the second surface 121A as shown in FIG. 4A, the first surface 111A shown in FIG. 4B, the first surface 111A and second surface 121A shown in FIG. 4C, the second surface 121A shown in FIG. 5A, the first surface 111A shown in FIG. 5B, and the first surface 111A and second surface 121A shown in FIG. 5C.

This enables implementing the tolerating mechanism (111A, 121A) by a simpler method.

(4-1-2b) Alternative Shapes

Figure 6C:
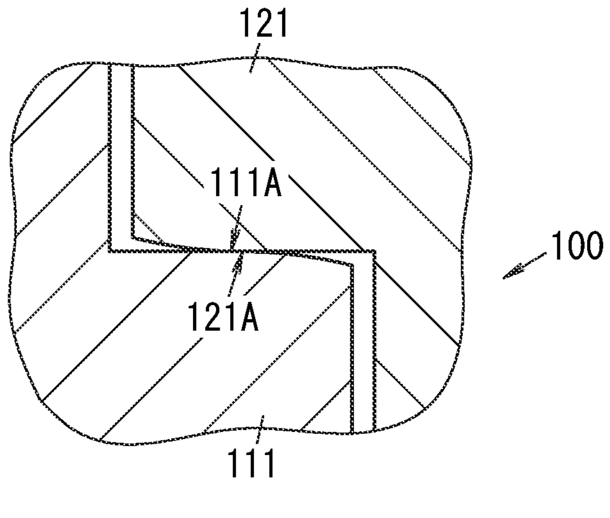
FIG. 6C is a cross-sectional view of the fitting portion of the anvil in a situation where each of the first and second surfaces has a convex curved surface portion as a rounded corner portion thereof.

Alternatively, the convex curved surface part may also be, for example, a curved surface, of which the curvature is largest at an end portion thereof and decreases gradually as the distance from the end portion increases (i.e., a so-called "rounded curved surface") as in, for example, the second surface 121A shown in FIG. 6A, the first surface 111A shown in FIG. 6B, and the first surface 111A and second surface 121A shown in FIG. 6C.

Nevertheless, the convex curved surface part does not have to be a spherical surface or a rounded curved surface but may also be a smoothly curved convex surface.

(5) Restricting Mechanism

It is preferable that the fitting portion 100 further have a restricting mechanism (14, 15). The restricting mechanism (14, 15) is a mechanism for restricting misalignment.

As used herein, restricting the misalignment may be, for example, setting the angle $\theta$ at a value smaller than a predetermined second threshold value $\theta 2$ (where $\theta 1<\theta 2$). The second threshold value $\theta 2$ may be, but does not have to be, 5 degrees, for example. Alternatively, the second threshold value $\theta 2$ may also fall, for example, within the range of 4-6 degrees or within the range of 3-7 degrees, whichever is appropriate.

Having the misalignment restricted by the restricting mechanism (14, 15) ensures sufficient durability for the anvil 1.

(5-1) Centering Member

The restricting mechanism (14, 15) includes a shaft-shaped centering member 14. The centering member 14 is disposed inside the fitting portion 100.

This enables implementing the restricting mechanism (14, 15) by a simple method.

(5-2) Elastic Member

The restricting mechanism (14, 15) further includes a ringlike elastic member 15. The elastic member 15 is arranged to surround the outer periphery of the fitting portion 100.

For example, a groove may be provided circumferentially along the outer periphery of the fitting portion 100 and the elastic member 15 may be fitted into the groove.

Having the misalignment restricted by the elastic member 15 enables implementing a restricting mechanism (14, 15) with a high degree of durability by a simple method.

(6) Shock Absorber

The anvil 1 further includes a shock absorber 13. The shock absorber 13 is disposed inside the fitting portion 100. The shock absorber 13 reduces vibrations produced in the axial direction when the fastening member is tightened.

(7) Gap in Axial Direction

The centering member 14 and the shock absorber 13 leave a gap in the axial direction between the first member 11 and the second member 12. The gap in the axial direction not only allows the shock absorber 13 to expand and shrink but also contributes to tolerating or restricting the misalignment.

As can be seen from the foregoing description, the impact rotary tool 10 according to this embodiment may contribute to reducing the vibrations in the radial direction while ensuring sufficient durability for the anvil 1 by having the misalignment tolerated by the tolerating mechanism (111A, 121A) and by having the misalignment restricted by the restricting mechanism (14, 15). In addition, the impact rotary tool 10 may also contribute to reducing the vibrations in the axial direction by using the shock absorber 13.

(8) Recapitulation

An impact rotary tool (10) according to a first aspect includes: a hammer (30); and an anvil (1) that transmits rotational impact force from the hammer (30) to a tip tool (20). The anvil (1) includes a first member (11) and a second member (12). The first member (11) holds the tip tool (20) thereon. The first member (11) is fitted into the second member (12). The rotational impact force is applied to the second member (12). The first member (11) and the second member (12) are arranged to be fitted into each other in a fitting portion (100). The fitting portion (100) has a tolerating mechanism (111A, 121A). The tolerating mechanism (111A, 121A) tolerates misalignment of a first rotational axis (AX1) with a second rotational axis (AX2). The first rotational axis (AX1) is a rotational axis of the first member (11). The second rotational axis (AX2) is a rotational axis of the second member (12).

According to this aspect, tolerating the misalignment of a first rotational axis of a first member of the anvil with a second rotational axis of a second member of the anvil allows, even if the second rotational axis is misaligned with the direction in which a fastening member is inserted, the first rotational axis to be kept aligned with the direction in which the fastening member is inserted, thus contributing to reducing the vibrations produced in the radial direction.

In contrast, as described in the background section, the rotational impact tool in which the first and second members are fitted and fixed to each other does not tolerate the misalignment of the first rotational axis of the first member with the second rotational axis of the second member, thus producing vibrations in the radial direction.

In an impact rotary tool (10) according to a second aspect, which may be implemented in conjunction with the first aspect, the fitting portion (100) includes a first fitting portion (111) and a second fitting portion (121). The first fitting portion (111) forms part of the first member (11) and is fitted into the second member (12). The first fitting portion (111) has a first surface (111A) as one surface thereof. The second fitting portion (121) forms part of the second member (12) and is fitted into the first member (11). The second fitting portion (121) has a second surface (121A) as one surface thereof. The first surface (111A) and the second surface (121A) face each other. The tolerating mechanism (111A, 121A) is implemented by forming at least part of the first surface (111A) and/or at least part of the second surface (121A) in a convex curved surface shape.

This aspect enables implementing the tolerating mechanism by a simple method.

In an impact rotary tool (10) according to a third aspect, which may be implemented in conjunction with the second aspect, the tolerating mechanism (111A, 121A) is implemented by forming a part of either the first surface (111A) or the second surface (121A) in the convex curved surface shape.

This aspect enables implementing a tolerating mechanism that tolerates misalignment in a broad range by a simple method by reducing the area of contact between the first and second surfaces.

In an impact rotary tool (10) according to a fourth aspect, which may be implemented in conjunction with the second aspect, the tolerating mechanism (111A, 121A) is implemented by forming almost all of either the first surface (111A) or the second surface (121A) in the convex curved surface shape.

This aspect enables implementing a tolerating mechanism with a high degree of durability by increasing the area of contact between the first and second surfaces.

In an impact rotary tool (10) according to a fifth aspect, which may be implemented in conjunction with the third or fourth aspect, the part, formed in the convex curved surface shape, of either the first surface (111A) or the second surface (121A) has a constant curvature.

This aspect enables implementing the tolerating mechanism by a simpler method.

In an impact rotary tool (10) according to a sixth aspect, which may be implemented in conjunction with any one of the first to fifth aspects, the fitting portion (100) further has a restricting mechanism (14, 15). The restricting mechanism (14, 15) restricts the misalignment.

This aspect ensures sufficient durability for the anvil by restricting the misalignment.

In an impact rotary tool (10) according to a seventh aspect, which may be implemented in conjunction with the sixth aspect, the fitting portion (100) is formed in a cylindrical shape. The restricting mechanism (14, 15) includes a shaft-shaped centering member (14). The centering member (14) is disposed inside the fitting portion (100).

This aspect enables implementing the restricting mechanism by a simple method.

In an impact rotary tool (10) according to an eighth aspect, which may be implemented in conjunction with the seventh aspect, the restricting mechanism (14, 15) further includes a ringlike elastic member (15). The elastic member (15) is provided to surround an outer periphery of the fitting portion (100).

This aspect enables implementing a restricting mechanism with a high degree of durability by a simple method.

In an impact rotary tool (10) according to a ninth aspect, which may be implemented in conjunction with the seventh or eighth aspect, the anvil (1) further includes a shock absorber (13). The shock absorber (13) is disposed inside the fitting portion (100). The centering member (14) and the shock absorber (13) leave a gap, aligned with the second rotational axis (AX2), between the first member (11) and the second member (12).

This aspect contributes to reducing vibrations in the radial direction by tolerating and restricting the misalignment while contributing to reducing vibrations in the axial direction by expanding and shrinking the shock absorber.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An impact rotary tool comprising: a hammer; and an anvil configured to transmit rotational impact force from the hammer to a tip tool, the anvil including:

a first member configured to hold the tip tool thereon; and a second member to which the first member is fitted and to which the rotational impact force is applied, wherein:

the first member and the second member are arranged to be fitted into each other in a fitting portion, the fitting portion has a tolerating mechanism configured to tolerate misalignment of a first rotational axis with a second rotational axis, the first rotational axis being a rotational axis of the first member, the second rotational axis being a rotational axis of the second member, the fitting portion includes:

a first fitting portion forming part of the first member and fitted into the second member, the first fitting portion having a first surface as one surface thereof; and a second fitting portion forming part of the second member and fitted into the first member, the second fitting portion having a second surface as one surface thereof, the first surface and the second surface face each other, and the tolerating mechanism tolerates the misalignment of the first rotational axis with the second rotational axis in a state in which a portion of the first surface and a portion of the second surface are in contact with each other in a direction about the second rotational axis.

2. The impact rotary tool of claim 1, wherein the tolerating mechanism is implemented by forming at least part of the first surface and/or at least part of the second surface in a convex curved surface shape.

3. The impact rotary tool of claim 2, wherein the tolerating mechanism is implemented by forming a part of either the first surface or the second surface in the convex curved surface shape.

4. The impact rotary tool of claim 3, wherein the part, formed in the convex curved surface shape, of either the first surface or the second surface has a constant curvature.

5. The impact rotary tool of claim 2, wherein the tolerating mechanism is implemented by forming almost all of either the first surface or the second surface in the convex curved surface shape.

6. The impact rotary tool of claim 1, wherein the fitting portion further has a restricting mechanism configured to restrict the misalignment.

7. The impact rotary tool of claim 6, wherein the fitting portion is formed in a cylindrical shape, and the restricting mechanism includes a shaft-shaped centering member disposed inside the fitting portion.

8. The impact rotary tool of claim 7, wherein the restricting mechanism further includes a ringlike elastic member provided to surround an outer periphery of the fitting portion.

9. The impact rotary tool of claim 7, wherein the anvil further includes a shock absorber disposed inside the fitting portion, and the centering member and the shock absorber leave a gap, aligned with the second rotational axis, between the first member and the second member.

* * * * *